United States Patent [19]

Komatsu et al.

[11] Patent Number: 5,183,686
[45] Date of Patent: Feb. 2, 1993

[54] METHOD FOR MANUFACTURING MAGNETIC RECORDING MEDIA

[75] Inventors: Kazunori Komatsu; Mikio Tomaru, both of Kanagawa, Japan

[73] Assignee: Fuji Photo Film Co., Ltd., Tokyo, Japan

[21] Appl. No.: 836,890

[22] Filed: Feb. 19, 1992

[30] Foreign Application Priority Data

Feb. 20, 1991 [JP] Japan .................................. 3-045533

[51] Int. Cl.⁵ .............................................. B05D 3/14
[52] U.S. Cl. ................................... 427/549; 427/128; 427/130; 427/289
[58] Field of Search .................. 427/48, 128, 130, 289

Primary Examiner—Bernard Pianalto
Attorney, Agent, or Firm—Sughrue, Mion, Zinn, Macpeak & Seas

[57] ABSTRACT

A method for manufacturing a magnetic recording medium includes continuously conveying a support, applying a magnetic solution to the support to form a magnetic layer thereon, and subjecting the magnetic layer thus formed on the support to orientation and drying. The magnetic solution is prepared by dispersing magnetic particles therein such that the magnetization of the magnetic solution provided by a magnetic field having a predetermined field strength being applied thereto for one minute satisfies a relationship:

$M_H/M_S > 2H/Hc$, where $M_S$ is the saturation magnetization of the magnetic solution, Hc is the coercive force (Oe) of the ferromagnetic particles in the magnetic solution, and $Hc/5 \geq H \geq Hc/50$.

11 Claims, 2 Drawing Sheets

METHOD FOR MANUFACTURING MAGNETIC RECORDING MEDIA

BACKGROUND OF THE INVENTION

This invention relates to a method for manufacturing magnetic recording media, and more particularly to a method for preparing a magnetic solution by dispersion, the magnetic solution being applied to a support.

Methods for manufacturing magnetic recording media such as magnetic tapes and floppy disks are well known in the art in which a magnetic solution prepared by dispersing ferromagnetic particles is applied to a belt-shaped support which is being conveyed continuously in the longitudinal direction, and in which the magnetic solution on the support is magnetically oriented and dried. The resultant support is cut or stamped out to form a magnetic recording media.

The magnetic solution applied to the support is generally prepared by kneading and dispersing ferromagnetic particles, a bonding agent, a dispersing agent, and a lubricant with an organic solvent. The dispersion of the ferromagnetic particles in the magnetic solution thus prepared greatly affects the electromagnetic conversion characteristic of the magnetic recording medium which is formed through the above-described steps of applying the magnetic solution to the support, magnetically orientating the magnetic solution on the support, and then drying the magnetic solution.

Recently, there has been a strong demand for increasing the magnetic particle density of a magnetic recording media. To meet this requirement, ferromagnetic particles having a small grain size and a large specific surface area are used to improve the S/N ratio and squareness ratio. It is essential to uniformly disperse the ferromagnetic particles in the bonding agent.

Much research has been carried out regarding the dispersion and magnetic orientation of $\gamma$-Fe$_2$O$_3$ particles for magnetic recording media to determine the optimum method. A main issue for the characteristics of a magnetic recording medium concerns the effect of the mutual action between $\gamma$-Fe$_2$O$_3$ particles and macro molecules and the behavior of adsorption of macro molecules on the dispersion and magnetic orientation of the $\gamma$-Fe$_2$O$_3$ particles. Accordingly, the dispersion of ferromagnetic particles in a magnetic solution must be evaluated. For this purpose, a rotational vibration method has been proposed by Katsuhiko Nakamae et al. (see "Hyomen" (Surfaces) vol. 25, no. 7 (1987), page 401). In this method, a low magnetic field is applied for a certain time period in which the magnetic moment is not inverted by magnetization, and the value $M_H/M_S$, which is obtained by dividing the magnetization $M_H$ of the magnetic solution at that time by the saturation magnetization $M_S$, is employed to evaluate the dispersion of ferromagnetic particles in the magnetic solution.

On the other hand, it has been found through the application of the above-described evaluation method to magnetic solutions that, even with the same kind of ferromagnetic particles, the value $M_H/M_S$ depends greatly on the prescribed magnetic solution, particularly on the viscosity thereof. That is, even when magnetic solutions are selected which have equal dispersion states, a magnetic solution having a high viscosity has a low $M_H/M_S$ value, and conversely a magnetic solution having a low viscosity has a high $M_H/M_S$ value. This effect of viscosity is neither referred to nor addressed in the aforementioned reference, and likewise neither is the value $M_H/M_S$ for the actual magnetic solutions. Hence, it is difficult to apply the evaluation method to an actual method for manufacturing a magnetic solution.

To obtain a magnetic solution having a high dispersion, a method for evaluating a magnetic solution must be established. However, there has not yet been proposed a method for evaluating the dispersion of a magnetic solution with high accuracy.

SUMMARY OF THE INVENTION

In view of the foregoing problems of the conventional methods, an object of the present invention is to provide a method for manufacturing a magnetic recording medium having excellent performance characteristics, for example having both a high S/N ratio and a squareness ratio, in which, during manufacture of a magnetic solution in the process of dispersion, the above-described value $M_H/M_S$ is controlled by dispersing the magnetic particles in the magnetic solution with the particular relation between the external magnetic field (H) and the coercive force (Hc) of the magnetic particles being used as a reference.

The foregoing and other objects of the invention have been achieved by a method for manufacturing a magnetic recording medium in which a magnetic solution is applied to a support which is being continuously conveyed to form a magnetic layer thereon, and the magnetic layer thus formed is subjected to magnetic orientation and drying. According to the invention, the magnetic solution is prepared by dispersing the magnetic particles therein so that the magnetization $M_H$ of the magnetic solution provided when a magnetic field H (Oe) in field strength is applied thereto for one minute satisfies the following relation:

$$M_H/M_S > 2H/Hc$$

where $M_S$ is the saturation magnetization of the magnetic solution, Hc is the coercive force (Oe) of the magnetic particles in the magnetic solution, and $Hc/5 \geq H \geq Hc/50$, and the magnetic solution thus prepared is applied to the support to form a magnetic layer thereon which is subjected successively to magnetic orientation and drying.

The above-described relation has been determined by employing a variety of different ferromagnetic particles and preparing a variety of different magnetic solutions by dispersing the ferromagnetic particles to various viscosities in a variety of prescriptions. The values of $M_H/M_S$ of the magnetic solutions thus prepared were measured. Thereafter, the magnetic solutions were applied to the supports, magnetically oriented, and dried. The resultant supports thus processed were cut to form magnetic tapes. The electromagnetic conversion characteristics of the magnetic tapes thus formed were then compared to determine the above-described relation.

DESCRIPTION OF THE PREFERRED EMBODIMENTS

Figure 1:
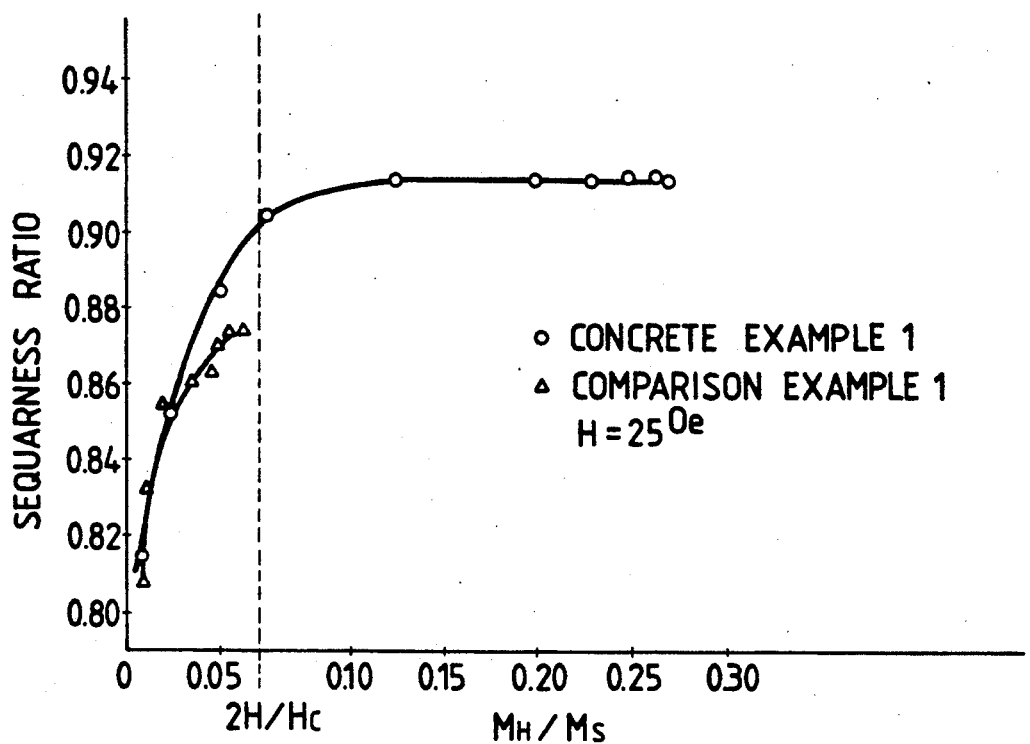
FIG. 1 is a graphical representation indicating a squareness ratio with $M_H/M_S$ in Inventive Example 1 and Comparative Example 1 described herein with a magnetic field strength of 25 Oe.

For current magnetic recording media, arranging a magnetic substance having a high coercive force with a high packing density and with a high orientation is required. For this purpose, the magnetic particles must be dispersed in the magnetic solution to the order of primary particles. Thus, in manufacturing a magnetic tape, the dispersion process is an important process has a strong effect on the magnetic tape performance.

In an ordinary magnetic solution, the magnetic particles have high mutual action and high content (magnetic particle: binder ratio=8:2 (weight ratio)), and are less than 1 $\mu$m in grain size. That is, the magnetic particles have a considerably high degree of dispersion. Therefore, it is difficult to accurately evaluate the dispersion state of the magnetic particles in the ordinary magnetic solution. However, evaluating the degree of dispersion in the dispersion process is important for evaluation of the performance of a magnetic solution and for research on the mutual action between magnetic particles having a grain size on the order of microns. Hence, in manufacturing a magnetic solution, it is essential to: (1) disperse the magnetic particles sufficiently; and (2) evaluate the dispersion degree of the magnetic particles with high accuracy.

There are a number of methods available of dispersing magnetic particles. That is, a variety of dispersing devices such as a ball mill, a vibration mill, an attriter (an attrition mill), a homogenizing mixer, a sand mill, or a triple roll may be used for dispersing magnetic particles. The dispersion of magnetic particles is important in determining the orientation and packing density of the magnetic particles, and the surface characteristics of the resultant magnetic tape. Therefore, a high power dispersing device must be used. However, if the dispersing device has an excessively high output power, then the magnetic particles may be broken, thereby causing their magnetic characteristics to deteriorate. Thus, a dispersing device suitable for the magnetic particles must be selected.

The aforementioned dispersing devices will be briefly described. The ball mill is used most extensively and provides strong impulse and shearing forces. Thus, the ball mill is suitable for dispersion of magnetic particles. However, the ball mill is disadvantageous in that it is difficult in a ball mill to smoothly discharge the particles, and the device is noisy. The vibration mill, in which the vibration and impact of balls and rods is employed to pulverize and disperse the magnetic particles, is powerful. In the attriter, alumina steel balls are agitated with agitating blades in such a manner that the shearing force thereof disperses the magnetic particles. The sand mill has the same operating principle as the ball mill, can be operated continuously, and can provide a high dispersing force. The triple roll performs a kneading operation using a high shearing force and pressure. With the triple roll, condensates of the particles can be completely broken.

As is apparent from the above description, a number of dispersing methods can be employed for dispersing magnetic particles, and the methods should be selectively employed according to the performance and characteristics required.

To manufacture a magnetic solution having high dispersion, first it is necessary to establish a method for evaluating a magnetic solution. Regarding ordinary coating solutions, the dispersion of pigment can be evaluated by a number of methods, e.g., a method using a fineness gauge, a precipitation analysis method, a precipitation potential method, a call counter method, an optical measuring method, or a dielectric constant measuring method.

However, application of those methods, which are normally used in ordinary coating solutions, to recording magnetic solutions are not very effective. For example, the fineness gauge is not precise enough to evaluate a magnetic solution because the fineness gauge selects the highest one of a number of highly dispersed magnetic solutions.

For practical magnetic solutions, a direct method is available in which a magnetic solution is evaluated from the performance of the rotation of particles in a low magnetic field. Additionally, an indirect method may be employed which is based on surface smoothness, magnetic orientation and packing density of a magnetic solution, and the electrical characteristics of the magnetic solution coated on a support such as signal-to-noise (S/N) ratio, direct current (DC) noise and short wavelength record.

In the direct method, the dispersion of magnetic particles in a magnetic solution is evaluated before it is applied to the support. On the other hand, in the indirect method, a magnetic tape is manufactured with the magnetic solution, and the magnetic film so formed is evaluated to determine the dispersion of the magnetic particles.

These methods are applicable to some extent when it is difficult for ordinary methods to evaluate the dispersion of magnetic particles in a magnetic solution. For example, when the magnetic particles are sufficiently dispersed, they can be oriented more effectively, and the orientation is much improved. Additionally, when the magnetic particles are sufficiently dispersed, the packing density is also improved. More specifically, when the magnetic particles are well dispersed, then the number of aggregated particles is decreased accordingly. That is, the percentage of voids is also decreased, and therefore the packing density is improved. The surface roughness is related closely to the dispersion of particles in magnetic solutions as well as in ordinary pigments.

Furthermore, the electromagnetic conversion characteristics such as S/N ratio, DC noise and short wavelength record output can be utilized to determine the dispersion of magnetic particles. For research, development and quality control of magnetic solutions, the relationships between the time periods required for dispersion of magnetic particles and those characteristic values may be obtained to evaluate the conditions of magnetic solutions.

In the method for evaluating the dispersibility of magnetic particles in a magnetic solution from the performance of rotation of particles, the evaluation is conducted by examining the variation in magnetization provided when a low magnetic field is applied to the magnetic solution in which the moment is not switched (i.e., the magnetic moment in one easy-axis direction is not inverted). The specific feature of the method resides in using a low external magnetic field in which the motion of the magnetic field of the magnetic moment and the rotation of particles can be distinguished from each other.

Let us consider the variation in magnetization in a rotation model which is obtained, for example, when a suitable magnetic field is applied in a positive direction and in a negative direction at certain time intervals. If there is mutual action between the particles because they are of primary dispersion, the particles are readily oriented in the direction of the magnetic field thus applied.

However, in a practical system, aggregated particles exist and mutual action occurs between the particles, and therefore variations in magnetization occur in which the inversion is not completely effected. Hence, the amplitude of the oscillation curve represents how well the particles can rotate, i.e., the amplitude indicates the dispersibility of magnetic particles. The envelope of the amplitudes of the oscillation curve indicates the process of aggregation of dispersed particles, i.e., the stability in the aggregation process.

Dispersibility can be defined in various ways, i.e., it can be evaluated quantitatively by the ratio of magnetization to saturation magnetization provided a predetermined time period after application of a particular magnetic field. Stability can also be defined in various ways, i.e., the rate of variation in magnetization of the envelope after a certain time period has lapsed is compared with that at a time instant a certain time period thereafter. With the comparison results as a parameter, the stability can be evaluated rapidly.

The present inventors have applied this evaluation method to actual magnetic solutions and have conducted intensive research on this method. It has been determined that even with the same kind of ferromagnetic particles, the prescription of a magnetic solution, particularly, the viscosity, greatly affects the aforementioned value $M_H/M_S$. That is, if a magnetic solution is maintained unchanged in its degree of magnetic particle dispersion, the magnetic solution is increased in viscosity, and the value $M_H/M_S$ is decreased. Conversely, if the viscosity is decreased, the value $M_H/M_S$ is increased.

As a result of the research conducted concerning the above determination, the evaluation method has been made effective by using the value $M_H/M_S$ for evaluation with a particular value as a reference. That is, the following method has been developed with satisfactory results.

A magnetic solution is prepared by dispersing the magnetic particles therein so that the magnetization $M_H$ of the magnetic solution obtained when a magnetic field of a field strength H (Oe) is applied thereto for one minute satisfies the following relation:

$$M_H/M_S > 2H/Hc$$

where $M_S$ is the saturation magnetization of the magnetic solution, Hc is the coercive force (Oe) of the magnetic particles in the magnetic solution, and $Hc/5 \geq H \geq Hc/50$.

In manufacturing a magnetic recording medium, the magnetic solution is prepared by dispersing the magnetic particles such that the value of $M_H$ (the degree of magnetization with a magnetic field applied) divided by $M_S$ (the saturation magnetization of the magnetic solution) is larger than the ratio of the external magnetic field (H) to the coercive force (Hc). That is, because of the provision of the concrete comparison value $M_H/M_S$, manufacturing the magnetic recording medium is improved in productivity and in quality control as compared to the conventional methods. Thus, the resultant magnetic recording medium has excellent magnetic characteristics.

As was described above, in manufacturing a magnetic recording medium, the magnetic solution is prepared by dispersing the magnetic particles during the dispersion process such that the value $M_H$ (the degree of magnetization with a magnetic field applied) divided by $M_S$ (the saturation magnetization of the magnetic solution) is larger than the ratio of the external magnetic field (H) to the coercive force (Hc). Therefore, the value $M_H/M_S$ to be set can be determined easily and accurately so that the magnetic solution can be evaluated with high accuracy. Accordingly, a magnetic solution can be provided in which ferromagnetic particles are dispersed uniformly. Hence, a high grade magnetic recording medium having an excellent S/N ratio and squareness ratio can be manufactured according to the invention.

INVENTIVE EXAMPLES AND COMPARATIVE EXAMPLES

The ferromagnetic particles and magnetic solution compositions employed in the following Inventive Examples and Comparative Examples are as follows:

Ferromagnetic particles

Ferromagnetic particles A: Co containing $\gamma$-Fe$_2$O$_3$
Ferromagnetic particles B: Ferromagnetic metal particles (Hc=1500 Oe)

Magnetic solution composition

| Composition A: | |
|---|---|
| Ferromagnetic particles | 100 parts by weight |
| Phosphoric acid containing vinyl chloride copolymer (polymerization degree 400) | 12 parts by weight |
| Polyurethane (Mn = 120,000) | 8 parts by weight |
| α-Al$_2$O$_3$ | 5 parts by weight |
| Stearic acid | 2 parts by weight |
| Butyl stearate | 2 parts by weight |
| Methyl ethyl ketone | 125 parts by weight |
| Toluene | 125 parts by weight |
| Polyisocyanate | 8 parts by weight |
| Composition B: | |
| Ferromagnetic particles | 100 parts by weight |
| Phosphoric acid containing vinyl chloride copolymer (polymerization degree 400) | 12 parts by weight |
| Polyurethane (Mn = 120,000) | 8 parts by weight |
| α-Al$_2$O$_3$ | 5 parts by weight |
| Stearic acid | 2 parts by weight |
| Butyl stearate | 2 parts by weight |
| Methyl ethyl ketone | 80 parts by weight |
| Toluene | 80 parts by weight |
| Polyisocyanate | 8 parts by weight |

INVENTIVE EXAMPLE 1

Materials of composition A with the ferromagnetic particles A were dispersed with a sand grinder, and the magnetization of the magnetic solution was measured every thirty (30) minutes, and simultaneously the magnetic solution was applied to a polyethylene terephthalate (PET) support 14 μm in thickness to yield a coated thickness of 4 μm when dried to form a magnetic layer thereon. Thereafter, the magnetic particles in the magnetic layer were magnetically oriented in the conveyance direction of the support with the magnetic field provided by a permanent magnet whose poles were arranged confronting each other. Thereafter, the magnetic layer was dried, and the support was cut to a predetermined width to form a magnetic tape. The squareness ratio of the magnetic tape thus formed was measured.

In Inventive Example 1, the strength of the magnetic field formed by the permanent magnet was 3,000 Oe, and the magnetic solution was measured with magnetic field strengths of 25 Oe and 70 Oe.

COMPARATIVE EXAMPLE 1

Materials of Composition B with the ferromagnetic particles A were dispersed with a sand grinder, and the magnetization of the magnetic solution was measured every thirty (30) minutes. Simultaneously, the magnetic solution was applied to a polyethylene terephthalate (PET) support in a thickness of 14 μm to yield a coated thickness of 4 μm when dried to form a magnetic layer thereon. Thereafter, the magnetic particles in the magnetic layer were oriented in the conveyance direction of the support with a magnetic field provided by a permanent magnet whose poles were arranged confronting each other. Thereafter, the magnetic layer was dried, and the support was cut to a predetermined width to form a magnetic tape. The squareness ratio of the magnetic tape thus produced was measured.

In Comparative Example 1, the strength of the magnetic field formed by the permanent magnet and the magnetic field strength employed were the same as those in Inventive Example 1.

INVENTIVE EXAMPLE 2

Materials of composition A with the ferromagnetic particles B were dispersed with a sand grinder, and the magnetization of the magnetic solution was measured every thirty (30) minutes. Simultaneously, the magnetic solution was applied to a polyethylene terephthalate (PET) support 14 μm in thickness so as to yield a thickness of 4 μm when dried to form a magnetic layer thereon. Thereafter, the magnetic particles in the magnetic layer were oriented in the conveyance direction of the support with the magnetic field provided by a permanent magnet whose poles were arranged confronting each other. Thereafter, the magnetic layer was dried, and the support was cut to a predetermined width to form a magnetic tape. The squareness ratio of the magnetic tape thus produced was measured.

In Inventive Example 2, the strength of the magnetic field produced by the permanent magnet was 5,000 Oe, and the magnetic solution was measured with magnetic field strengths of 50 Oe and 150 Oe.

COMPARATIVE EXAMPLE 2

Materials of composition B with the ferromagnetic particles B were dispersed with a sand grinder, and the magnetization of the magnetic solution was measured every thirty (30) minutes. Simultaneously, the magnetic solution was applied to a polyethylene terephthalate (PET) support in a thickness of 14 μm so as to yield a thickness of 4 μm when dried to form a lo magnetic layer thereon. Thereafter, the magnetic particles in the magnetic layer were oriented in the conveyance direction of the support with the magnetic field produced by a permanent magnet whose poles were arranged confronting each other. Thereafter, the magnetic layer was dried, and the support was cut to a predetermined width to form a magnetic tape. The squareness ratio of the magnetic tape thus formed was measured.

In Comparative Example 2, the strength of the magnetic field formed by the permanent magnet and the magnetic field strength employed were the same as those in Inventive Example 2.

In the above-described Inventive Examples and Comparative Examples, the values of magnetization ($M_H$ and $M_S$) and the squareness ratios of the solutions were measured with a vibration specimen type magnetometer model VSM manufactured by Tohei Kogyo Co., Ltd.

Figure 2:
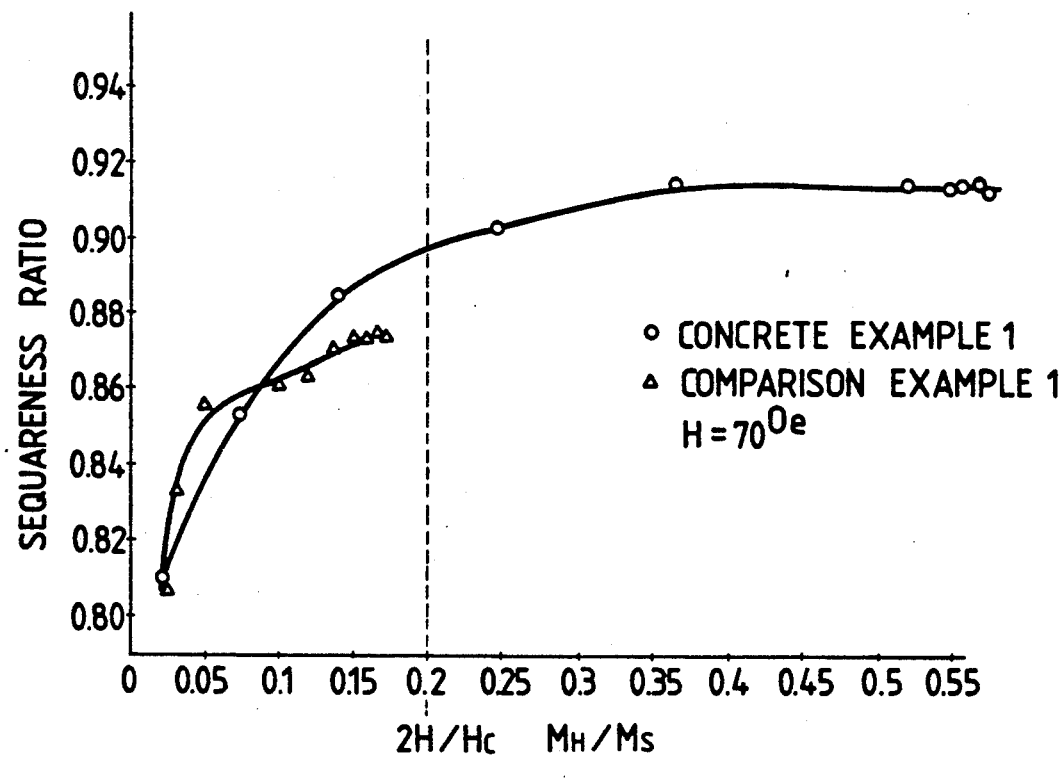
FIG. 2 is a graphical representation indicating a squareness ratio with $M_H/M_S$ in Inventive Example 1 and Comparative Example 1 with a magnetic field strength of 70 Oe.
Figure 3:
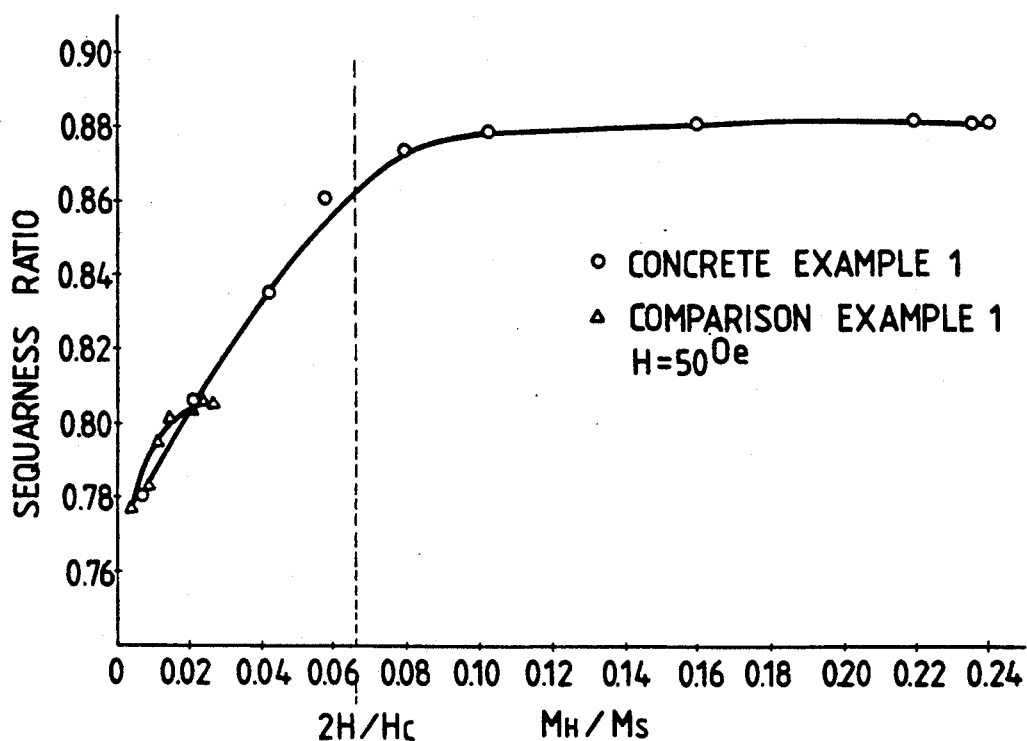
FIG. 3 is a graphical representation indicating a squareness ratio with $M_H/M_S$ in Inventive Example 2 and Comparative Example 2 described herein with a magnetic field strength of 50 Oe.
Figure 4:
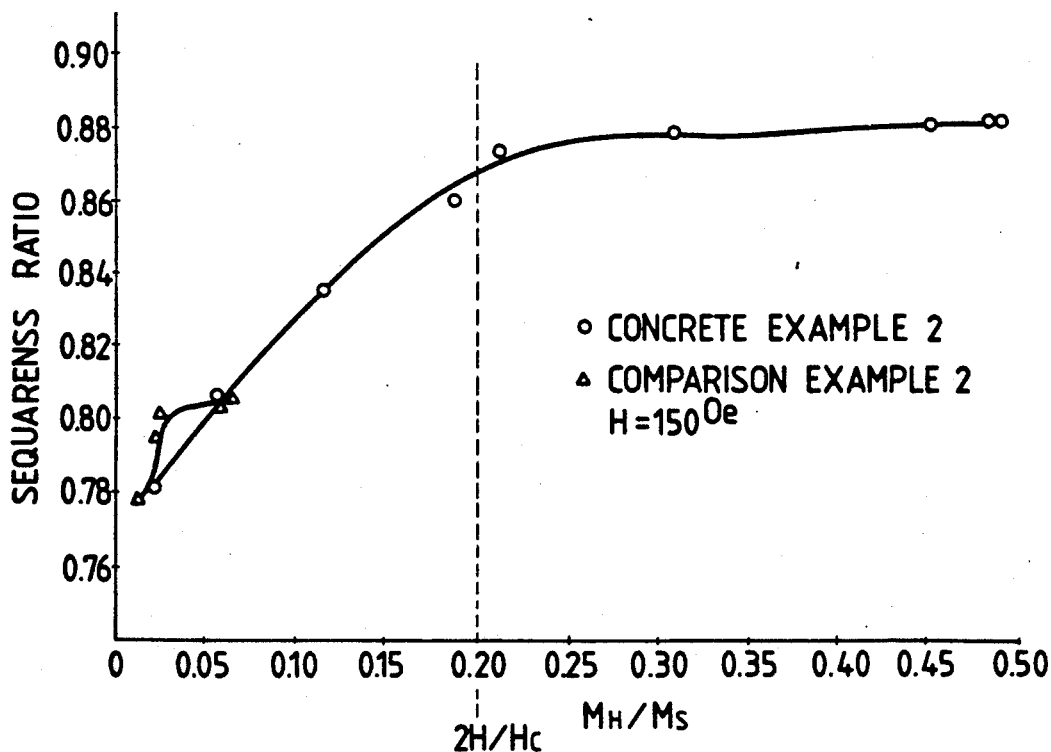
FIG. 4 is a graphical representation indicating a squareness ratio with $M_H/M_S$ in Inventive Example 2 and Comparative Example 2 with a magnetic field strength of 150 Oe.

The relationships between the values $M_H/M_S$ and the squareness ratios in the Inventive Examples and Comparative Examples were as indicated in FIGS. 1 through 4. FIG. 1 relates to Inventive Example 1 and Comparative Example 1, with a magnetic field strength of 25 Oe. FIG. 2 also relates Inventive Example 1 and Comparative Example 1, but with a magnetic field strength of 70 Oe. FIG. 3 relates to Inventive Example 2 and Comparative Example 2, with a magnetic field strength of 50 Oe. FIG. 4 also relates to Inventive Example 2 and Comparative Example 2, but with a magnetic field strength of 150 Oe.

The values $M_H/M_S$ of the magnetic solutions and the squareness ratios of the magnetic tapes in the Inventive Examples and Comparative Examples are indicated in Tables 1 through 4 below.

TABLE 1

| | Inventive Example 1: | | | | | | | | | |
|---|---|---|---|---|---|---|---|---|---|---|
| Dispersion Time (hrs) | 0.5 | 1 | 1.5 | 2 | 2.5 | 3 | 3.5 | 4 | 4.5 | 5 |
| $M_H/M_S$ (H = 25 Oe) | 0.009 | 0.025 | 0.051 | 0.077 | 0.126 | 0.201 | 0.232 | 0.251 | 0.266 | 0.271 |
| $M_H/M_S$ (H = 70 Oe) | 0.021 | 0.073 | 0.140 | 0.221 | 0.367 | 0.521 | 0.553 | 0.561 | 0.568 | 0.572 |
| Squareness Ratio | 0.814 | 0.853 | 0.885 | 0.903 | 0.914 | 0.914 | 0.914 | 0.914 | 0.915 | 0.914 |

2 H/Hc = 0.072 (H = 25 Oe) 0.200 (H = 70 Oe)

TABLE 2

| | Comparative Example 1: | | | | | | | | | |
|---|---|---|---|---|---|---|---|---|---|---|
| Dispersion Time (hrs) | 0.5 | 1 | 1.5 | 2 | 2.5 | 3 | 3.5 | 4 | 4.5 | 5 |
| $M_H/M_S$ (H = 25 Oe) | 0.009 | 0.012 | 0.021 | 0.037 | 0.046 | 0.051 | 0.058 | 0.061 | 0.063 | 0.064 |
| $M_H/M_S$ (H = 70 Oe) | 0.023 | 0.030 | 0.051 | 0.098 | 0.119 | 0.138 | 0.153 | 0.161 | 0.168 | 0.172 |
| Squareness Ratio | 0.808 | 0.833 | 0.855 | 0.861 | 0.864 | 0.871 | 0.874 | 0.874 | 0.875 | 0.874 |

2 H/Hc = 0.072 (H = 25 Oe) 0.200 (H = 70 Oe)

TABLE 3

| | Inventive Example 2: | | | | | | | | | |
|---|---|---|---|---|---|---|---|---|---|---|
| Dispersion Time (hrs) | 0.5 | 1 | 1.5 | 2 | 2.5 | 3 | 3.5 | 4 | 4.5 | 5 |
| $M_H/M_S$ (H = 25 Oe) | 0.007 | 0.021 | 0.043 | 0.059 | 0.081 | 0.104 | 0.161 | 0.221 | 0.238 | 0.241 |
| $M_H/M_S$ (H = 70 Oe) | 0.020 | 0.056 | 0.116 | 0.189 | 0.211 | 0.309 | 0.451 | 0.481 | 0.484 | 0.488 |
| Squareness Ratio | 0.781 | 0.806 | 0.835 | 0.851 | 0.874 | 0.879 | 0.881 | 0.882 | 0.882 | 0.882 |

2 H/Hc = 0.067 (H = 50 Oe) 0.200 (H = 150 Oe)

TABLE 4

| | Comparative Example 2: | | | | | | | | | |
|---|---|---|---|---|---|---|---|---|---|---|
| Dispersion Time (hrs) | 0.5 | 1 | 1.5 | 2 | 2.5 | 3 | 3.5 | 4 | 4.5 | 5 |
| $M_H/M_S$ (H = 25 Oe) | 0.004 | 0.009 | 0.011 | 0.014 | 0.021 | 0.023 | 0.026 | 0.025 | 0.027 | 0.027 |
| $M_H/M_S$ (H = 70 Oe) | 0.011 | 0.020 | 0.022 | 0.025 | 0.059 | 0.061 | 0.063 | 0.061 | 0.063 | 0.064 |
| Squareness Ratio | 0.778 | 0.783 | 0.795 | 0.801 | 0.804 | 0.805 | 0.805 | 0.806 | 0.805 | 0.805 |

2 H/Hc = 0.067 (H = 50 Oe) 0.200 (H = 150 Oe)

As is apparent from comparisons between Inventive Example 1 and Comparative Example 1 and between Inventive Example 2 and Comparative Example 2, the magnetic tapes manufactured according to the invention have an excellent squareness ratio and have excellent magnetic characteristics such as high sensitivity and a high S/N ratio.

While certain preferred embodiments have been described above, many changes and modifications within the spirit of the invention will be apparent to those of working skill in this technical field. Thus, the scope of the invention should be considered as limited only by the appended claims.

What is claimed is:

1. A method for manufacturing a magnetic recording medium, comprising the steps of:
   preparing a magnetic solution by dispersing ferromagnetic particles therein such that the magnetization $M_H$ of said magnetic solution provided by a magnetic field H (Oe) having a predetermined field strength being applied thereto for one minute satisfies the following relation:

$M_H/M_S > 2H/Hc$ where $M_S$ is the saturation magnetization of said magnetic solution, Hc is the coercive force (Oe) of the ferromagnetic particles in said magnetic solution, and $Hc/5 \geq H \geq Hc/50$;
   continuously conveying a support;
   applying said magnetic solution to said support being continuously conveyed to form a magnetic layer thereon; and
   subjecting said magnetic layer thus formed on said support to magnetic orientation treatment and drying.

2. The method according to claim 1, wherein said support is formed of a polyethylene terephthlate material.

3. The method according to claim 1, wherein said magnetic solution is applied to said support in a thickness of 14 μm to yield a thickness of 4 μm when dried.

4. The method according to claim 1, wherein said ferromagnetic particles are dispersed in said magnetic solution with a sand grinder.

5. The method according to claim 1, further comprising the step of cutting said support to a predetermined width after said magnetic layer has been dried.

6. The method according to claim 1, wherein said ferromagnetic particles in said magnetic layer formed on said support are magnetically oriented in the conveyance direction of said support with a magnetic field provided by a permanent magnet whose poles confront one another.

7. The method according to claim 1, wherein said magnetic field H is formed by a permanent magnet and has a field strength of 3,000 Oe, said method further comprising the step of measuring said magnetic solution with a magnetic field strength of one of 25 Oe and 70 Oe.

8. The method according to claim 1, wherein said magnetic field H is formed by a permanent magnet and has a field strength of 5,000 Oe, said method further comprising the step of measuring said magnetic solution with a magnetic field strength of one of 50 Oe and 150 Oe.

9. The method according to claim 1, wherein said ferromagnetic particles comprise cobalt containing $\gamma$-$Fe_2O_3$.

10. The method according to claim 8, wherein said ferromagnetic particles comprise ferromagnetic metal particles with Hc=1500 Oe.

11. The method according to claim 1, wherein said dispersing of said ferromagnetic particles in said magnetic solution is performed for a time period ranging from 0.5 hours to 5 hours.

* * * * *